June 25, 1968 W. M. BURNS 3,389,489
FISHING ROD ALARM ACCESSORY
Filed Oct. 12, 1965
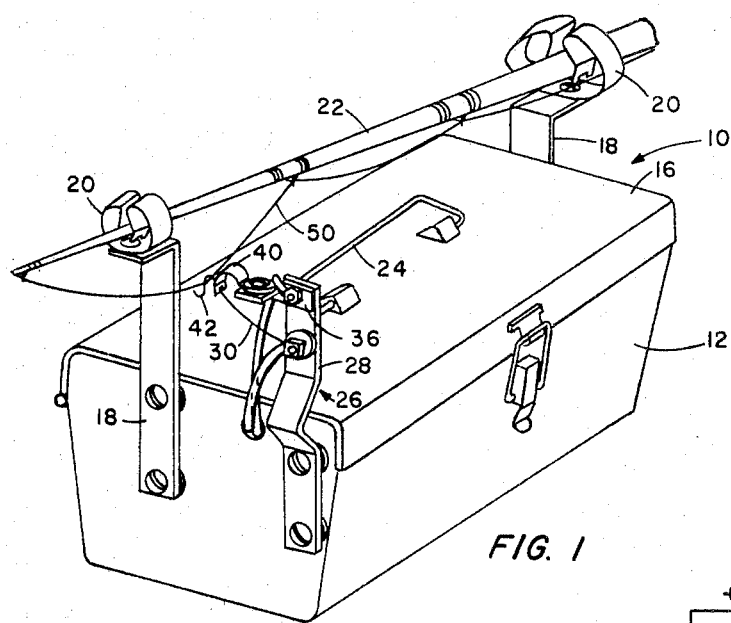
FIG. 1
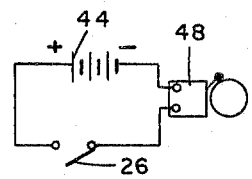
FIG. 3
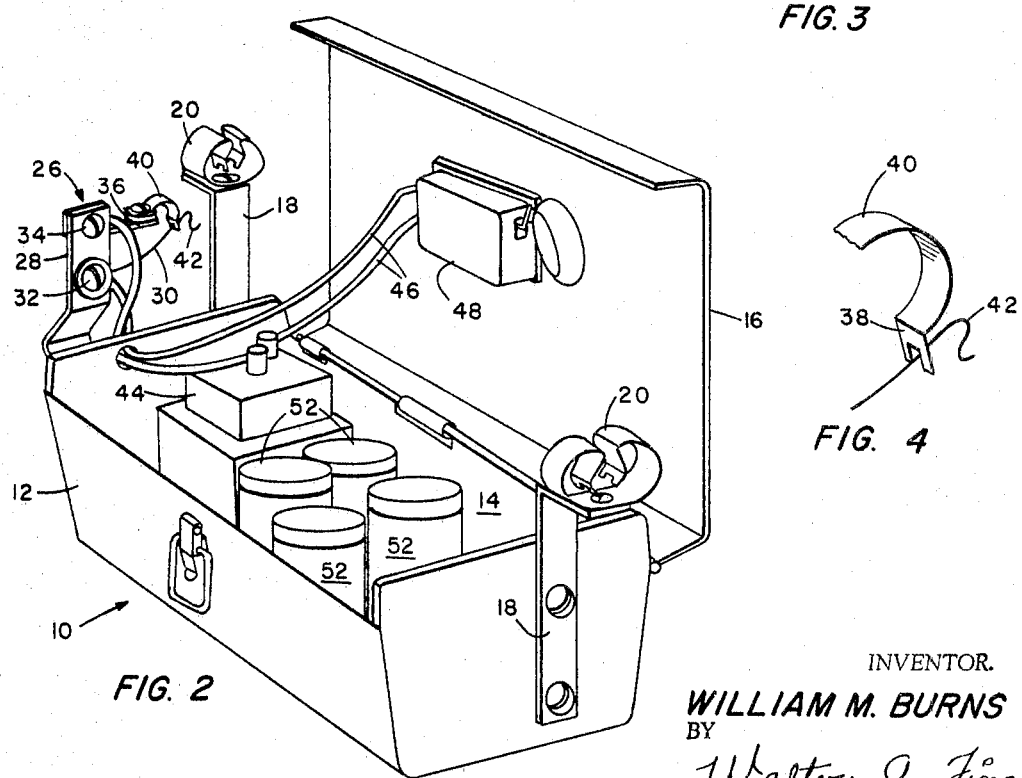
FIG. 2
FIG. 4
INVENTOR.
WILLIAM M. BURNS
BY
Walter G. Finch
ATTORNEY United States Patent Office 3,389,489
Patented June 25, 1968

3,389,489
FISHING ROD ALARM ACCESSORY
William M. Burns, 1418 Gelena Road,
Baltimore, Md. 21221
Filed Oct. 12, 1965, Ser. No. 495,202
2 Claims. (Cl. 43—17)

ABSTRACT OF THE DISCLOSURE

A tackle box is provided having a hingedly mounted lid, a pair of spaced clips mounted to the box clear of the lid for releaseably anchoring a fishing rod to the box, a support mounted to the box, a small diameter wire extending from the support and having a hook at its extremity resting on the fishing line of the fishing rod so as to move when the fishing line moves, a spring extending from the support and having a notch at its end freely surrounding the wire, with the movement of the fishing line causing the wire to touch the notch of the spring, and a signal system responsive to the touch of the wire to the spring.

This invention relates generally to fishing and more particularly it pertains to a rod holder tackle box with a signal device.

Various alarms have been devised in the past to signal a bite on fishing tackle. However they have various shortcomings which prevent their being popular. Among these are such auxiliary apparatus as rod-attached switches operated by the line or by the reel but which when the time comes to fight the fish become a nuisance and hindrance.

With such defects in mind it is the object of the present invention to provide a fishing alarm arrangement having a minimum engagement with the tackle and which will become disengaged from the rod when the latter is picked up.

Another object of this invention is to provide a switch element and alarm for a fishing rod which is simple and inexpensive to manufacture, works positively and gives a tentative nibble or positive bit signal which is automatically silenced upon lifting the rod.

Yet another object is to provide a tackle box serving as a rod holder and alarm whereby an amplified signal is provided. Still another object is to provide a rod-holding tackle box assembly which is conveniently moved from place to place as an assembly and which serves as an adequate anchorage for the rod.

Other objects and attendant advantages of the invention will become more readily apparent and understood from the following detailed specification and accompanying single sheet of drawings in which:

FIG. 1 is a perspective view of a tackle box incorporating the invention showing a fishing rod in place ready to sound an alarm;

FIG. 2 is a view of the tackle box with the lid open;

FIG. 3 is a schematic diagram of the electrical circuitry of the alarm; and

FIG. 4 is an enlarged detail view of the elements of the switch.

Referring now to the details of the drawings as shown in FIG. 1 reference numeral 10 indicates generally a fishing alarm arrangement embodying principles of this invention. This arrangement 10 consists of a metal or plastic tackle box 12 having the usual compartment cavity 14 and hinged lid 16 and on each end of the box 12 there is secured an inverted L-shaped bracket 18. Each bracket 18 has a resilient clip 20 adapted to releasably hold a fishing rod 22 parallel to one side and above the box handle 24 on the lid.

At one end of the box 12 a switch arrangement 26 is secured. This switch arrangement 26 comprises a vertical strip or support 28 having two spaced electrically insulated fasteners 32 and 34. An actuator wire 30 of small diameter spring wire is mounted on the lowermost fastener 32 and an electrically conductive bracket 36 is mounted on the upper fastener 34 as best shown in FIG. 2.

A U-shaped sheet metal spring 40 is secured on the end of this bracket 36 and has a notched offset end 38. The actuator wire 30 extends through this notched end 38 without touching it and terminates in an S-shaped hook 42 as depicted in FIG. 4.

A battery 44 in the compartment cavity 14 is connected with conductors 46 to a signal device 48 such as a buzzer or bell and with the insulated fasteners 32 and 34 of the switch arrangement 26 in electrical series as shown in FIG. 3.

In use the fishing rod 22 is releasably secured across the box 12 in the clips 20 and a bight of the fish line 50 brought over to engage hook 42 of the fine actuator wire 30. The battery 44 as well as the usual bait and accessory jars 52 in the compartment cavity 14 act as adequate ballast. Even a slight nibble by a fish will cause the fishline 50 to work the actuator wire 30 and cause it to contact within the notched offset end 38 to complete the electrical circuit to the battery 44 and signal device 48. The latter will sound off with an amplified effect if it is mounted on the lid 16 as shown due to resonance with the compartment cavity 14.

The fisherman need give no thought to the apparatus 10 engaging his tackle because as the rod 22 is lifted in preparation to fighting the fish the line 50 snaps off of the hook 42 and the rod is free. Further, the signal device automatically stops sounding.

If it is desired to move the rod to a better location the entire assembly of rod 22 and apparatus 10 is easily picked up without disengagement and carried by means of the tackle box handle 24.

Obviously many modifications and variations of the present invention are possible in light of the above teachings. It is, therefore, to be understood that within the scope of the appended claims the invention may be practiced otherwise than as specifically described.

I claim:
1. Apparatus for signaling the bite of a fish on the fishing line of a fishing rod, comprising a tackle box having a hingedly mounted lid, spaced clip means mounted to said box for releasably anchoring said fishing rod to said box, a handle mounted to the exterior surface of said lid out of the way of said fishing rod when said rod is anchored to said box, support means mounted to said box, a small diameter wire extending from said support means and having a hook at its extremity for resting on said fishing line so as to move therewith, spring means extending from said support means and having a notch in its end freely receiving said wire, with the movement of said fishing line causing said wire to touch the notch in said spring means, said wire and said spring means constituting an electrical switch and forming part of an electrical circuit, and signal means mounted to said box and responsive to the touching of said notch of said spring means by said wire to close the circuit and thereby signal movement of said fishing line.

2. The apparatus as recited in claim 1 wherein said signal means is secured to the interior surface of said lid and said support means is secured to said box clear of said lid.

References Cited

UNITED STATES PATENTS

| 1,737,921 | 12/1929 | Derr | 43—17 |
| 2,554,197 | 5/1951 | Kronquest | 43—17 |
| 2,567,777 | 9/1951 | Massino | 43—17 |

FOREIGN PATENTS 733,542   7/1932   France.

SAMUEL KOREN, Primary Examiner.

J. H. CZERWONKY, Assistant Examiner.